(12) United States Patent
Tanaka et al.

(10) Patent No.: US 7,002,136 B2
(45) Date of Patent: Feb. 21, 2006

(54) COLLIMATOR HAVING A HOLDER USED TO CONNECT ROD LENS TO CAPILLARY WHICH HOLDS OPTICAL FIBERS

(75) Inventors: Hiroyuki Tanaka, Osaka (JP); Takeshi Ishimaru, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 311 days.

(21) Appl. No.: 10/330,923

(22) Filed: Dec. 27, 2002

(65) Prior Publication Data

US 2003/0122064 A1   Jul. 3, 2003

(30) Foreign Application Priority Data

Dec. 28, 2001   (JP)   ............... 2001-401039

(51) Int. Cl.
*G01J 1/04*   (2006.01)

(52) U.S. Cl. .................... 250/227.11; 385/34

(58) Field of Classification Search ........... 250/227.11, 250/227.21, 216; 385/34, 33, 32, 31
See application file for complete search history.

(56) References Cited

U.S. PATENT DOCUMENTS

| 4,691,985 | A  | * | 9/1987 | Shank et al. ............ 385/84 |
| 6,597,837 | B1 | * | 7/2003 | Xiaofan ................. 385/33 |
| 6,707,609 | B1 | * | 3/2004 | Ryall et al. ............ 359/578 |

* cited by examiner

*Primary Examiner*—Que T. Le
(74) *Attorney, Agent, or Firm*—Fish & Richardson P.C.

(57) ABSTRACT

A collimator includes a capillary for holding optical fibers, a gradient index rod lens, and a cylindrical lens holder which holds the gradient index rod lens and has an annular end face connected to an end face of the capillary by an adhesive. By using the holder, the resistant of light power is improved and the degree of freedom of selection of the adhesive is increased.

19 Claims, 8 Drawing Sheets

Injection of Thermosetting Adhesive

Fig.9C

Optical Input
Optical Output

Y Direction
Z Direction ← ⊙ X Direction

COLLIMATOR HAVING A HOLDER USED TO CONNECT ROD LENS TO CAPILLARY WHICH HOLDS OPTICAL FIBERS

CROSS REFERENCE TO RELATED APPLICATIONS

Pursuant to 35 USC § 119, this application claims the benefit of Japan Patent Application No. 2001-401039 filed Dec. 28, 2002.

BACKGROUND OF THE INVENTION

The present invention relates to a collimator, and, more particularly, to a collimator including optical fibers held by a capillary and a gradient index rod lens which is optically connected to the optical fibers.

Figure 1:
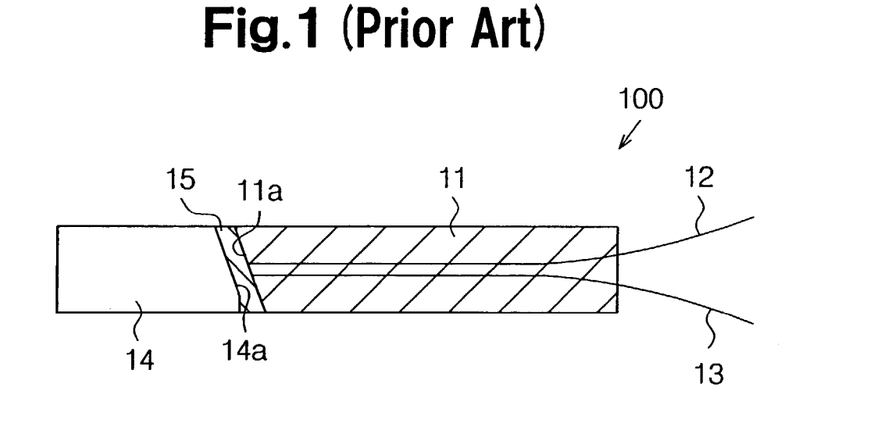
FIG. 1 is a cross-sectional view of a first conventional collimator.

For example, a conventional dual fiber collimator is assembled by connecting its components by a resin or adhesive. A collimator 100 shown in FIG. 1 is of a type in which a resin is impregnated in an optical path and includes optical fibers 12 and 13 held by a capillary 11 and a gradient index rod lens 14. The end face 11a of the capillary 11, which faces the lens 14, and end faces of the optical fibers 12 and 13 are inclined to prevent reflection and returning of light. The end face 14a of the rod lens 14, which faces the optical fibers 12 and 13, is also inclined. The end face 11a of the capillary 11 and the end face 14a of the rod lens 14 are connected together by an adhesive 15.

The collimator 100 in FIG. 1 has the following disadvantages.

(1) The adhesive 15 in the optical path of the rod lens 14 degrades the resistance of light power of the collimator 100.

(2) Because it is necessary to use an adhesive whose refractive index is matched with the refractive indexes of the rod lens 14 and the optical fibers 12 and 13, the degree of freedom of selection of the adhesive is small.

(3) There is no adhesive whose refractive index is completely matched with the refractive indexes of the rod lens 14 and the optical fibers 12 and 13, and relatively thin though the adhesive layer is, the transmittance of the adhesive is not 100%. Those points lead to light loss.

Figure 2:
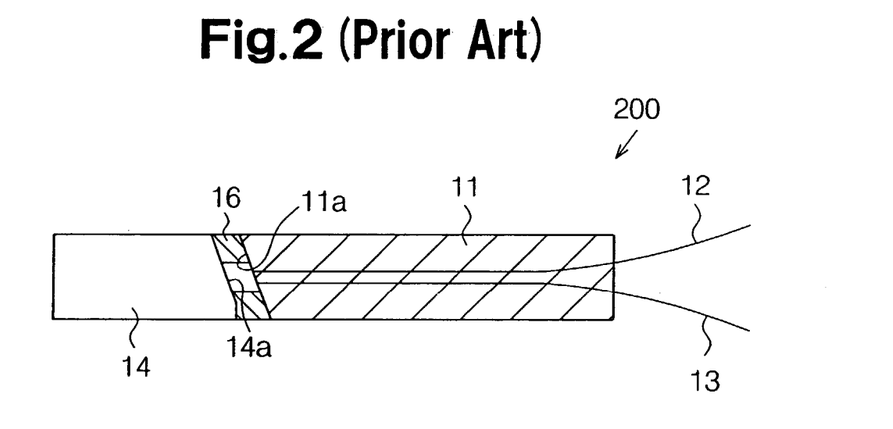
FIG. 2 is a cross-sectional view of a second conventional collimator.

A collimator 200 shown in FIG. 2 is of an optical-path free type. The end face 11a of the capillary 11 is connected to the end face 14a of the rod lens 14 by an adhesive 16 (or resin) such that the adhesive does not enter the optical path of the rod lens 14. In this case, the end face 11a and the end face 14a may be connected together by inserting a spacer with a proper thickness between those end faces. In case of the rod lens 14 with a diameter of 1.8 mm, for example, the rod lens 14 is connected to the capillary 11 such that the adhesive 16 does not enter the optical path with a diameter of 0.9 mm.

Because the adhesive 16 is present out of the optical path of the rod lens 14 in the collimator 200 in FIG. 2, the collimator 200 does not have the disadvantages of the collimator 100 shown in FIG. 1. It is, however, difficult to form a layer of the adhesive 16 in a gap of several tens of microns between the capillary 11 and the rod lens 14, excluding the optical path portion, while considering the position of the capillary 11. In this respect, the following connecting scheme has been proposed.

Generally, the wettability of adhesives varies depending on a target to be adhered. For example, the wettability is superior with respect to a cleaned glass surface and is inferior with respect to a dielectric thin film, such as an antireflection film. Using this property, the end face 14a of the rod lens 14 and the end face 11a of the capillary 11 where antireflection films are formed are processed as follows.

Figure 3A:
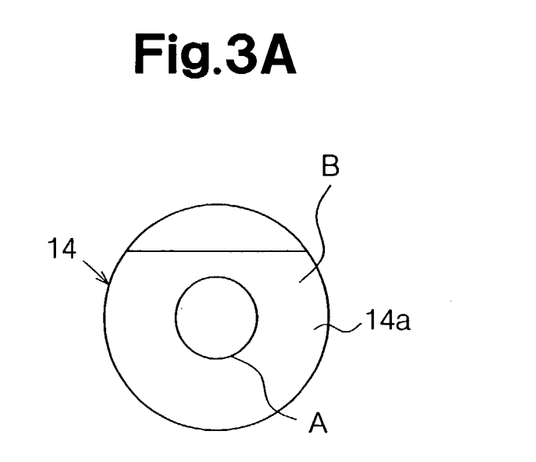
FIG. 3A is a diagram for explaining an end face treatment for the rod lens of the collimator of FIG. 2
Figure 3B:
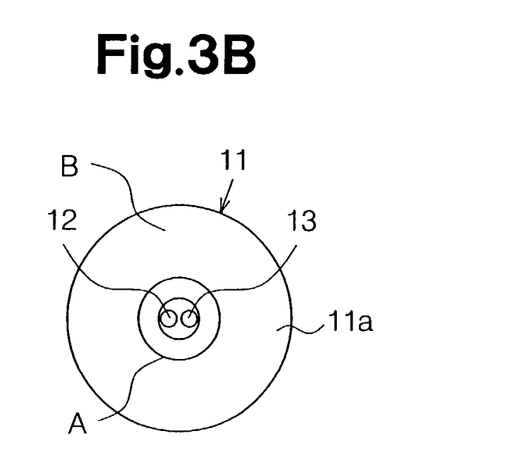
FIG. 3B is a diagram for explaining an end face treatment for the capillary of the collimator of FIG. 2.

An etching-resistant film is formed in intraoptical path areas (portions A in FIGS. 3A and 3B) of the antireflection films formed on the end faces 14a and 11a. Thereafter, those areas (portions B in FIGS. 3A and 3B) of the end faces 14a and 11a, which exclude the intraoptical path areas of the antireflection films, are removed by using a strong acid. Then, the etching-resistant film is removed and the adhesive 16 is injected into the gap between both end faces 14a and 11a. This scheme needs a treatment of the rod lens 14 and the capillary 11 with a chemical, such as a strong acid, and the treatment may damage optical parts, such as the rod lens 14.

SUMMARY OF THE INVENTION

In a first aspect of the present invention, a collimator is provided that includes an optical fiber, a capillary for holding the optical fiber, a gradient index rod lens, and a cylindrical holder which holds one of the capillary and the gradient index rod lens and has an annular end face connected to an end face of one of the capillary and the gradient index rod lens.

In a second aspect of the present invention, a collimator is provided that includes an optical fiber, a capillary for holding the optical fiber, a gradient index rod lens, and a cylindrical lens holder which holds the gradient index rod lens and has an annular end face connected to an end face of the capillary.

In a third aspect of the present invention, a collimator is provided that includes an optical fiber, a capillary for holding the optical fiber, a gradient index rod lens, and a capillary lens holder which holds the capillary and has an annular end face connected to an end face of the gradient index rod lens.

In a fourth aspect of the present invention, a method of manufacturing a collimator is provided. The method includes preparing a capillary holding an optical fiber, a gradient index rod lens and a cylindrical lens holder for holding the gradient index rod lens, the lens holder having an annular end face, causing the lens holder to hold the gradient index rod lens by inserting the gradient index rod lens into the lens holder, and connecting the annular end face of the lens holder to an end face of the capillary.

In a fifth aspect of the present invention, a method of manufacturing a collimator is provided. The method includes preparing a capillary holding an optical fiber, a gradient index rod lens and a cylindrical capillary holder for holding the capillary, the capillary having an annular end face, causing the capillary holder to hold the capillary by inserting the capillary into the capillary holder, and connecting the annular end face of the capillary holder to an end face of the gradient index rod lens.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 4:
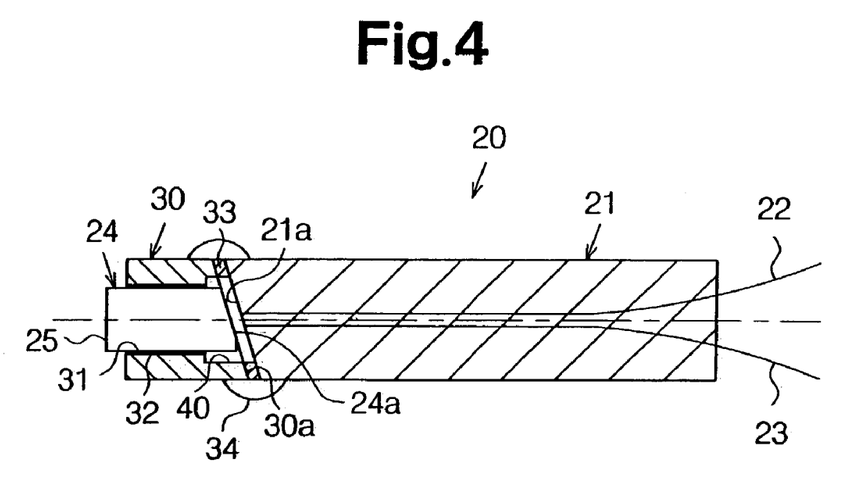
FIG. 4 is a cross-sectional view of a filter module according to a first embodiment of the present invention.
Figure 5:
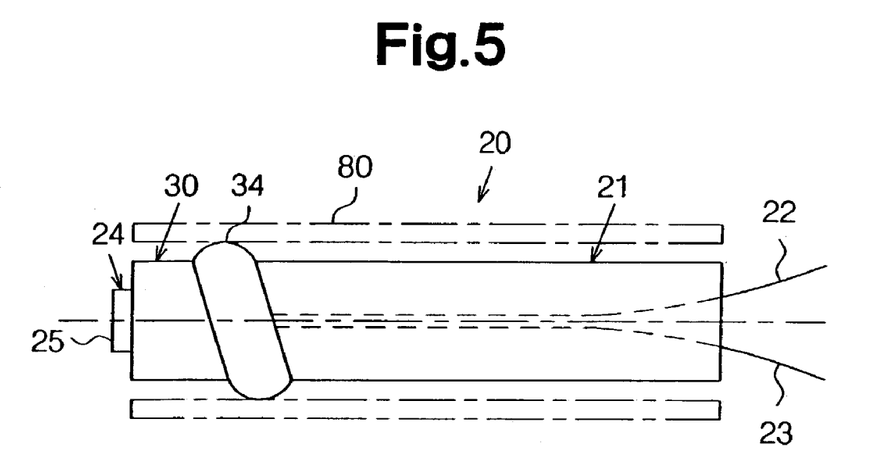
FIG. 5 is a plan view of the filter module of FIG. 4.

FIGS. 4 and 5 show a filter module 20 of a collimator type according to a first embodiment of the present invention which uses an optical fiber collimator (dual fiber collimator). The filter module 20 includes a capillary 21, two single mode optical fibers 22 and 23 held in the capillary 21, and a gradient index rod lens 24 which is optically connected to the optical fibers 22 and 23. A wavelength selectivity reflection film 25, which is a dielectric thin film having a wavelength selectivity, is formed on the flat end face of the rod lens 24. Light enters one of the optical fibers 22 and 23 and emerges from the end face of that optical fiber. The output light is collimated by the rod lens 24 and the collimated light is reflected at the wavelength selectivity reflection film 25. The reflected light is condensed by the rod lens 24 and is coupled to the other one of the optical fibers 22 and 23.

The filter module 20 further includes a cylindrical lens holder 30 which holds the rod lens 24. The lens holder 30 has a lens holding hole 31 where the rod lens 24 is inserted. The rod lens 24 inserted in the lens holding hole 31 is connected to the lens holder 30 by a thermosetting adhesive 32. With the rod lens 24 and the lens holder 30 connected together, an annular end face 30a of the lens holder 30 is connected to the end face 21a of the capillary 21, which faces the rod lens 24, by an optical adhesive 33. The portions connected by the optical adhesive 33, the end portion of the outer surface of the lens holder 30 and the end portion of the outer surface of the capillary 21 are covered with a structural adhesive 34, so that the lens holder 30 and the capillary 21 are integrated.

Available as the thermosetting adhesive 32 is a thermosetting epoxy adhesive, as typified by EPO-TEK™ 353ND (produced by Epoxy Technology Inc.), which has a relatively high glass transition temperature and a viscosity of 2000 cps or lower.

The optical adhesive 33 is used to connect the lens holder 30 to the capillary 21 in the fiber alignment position after the cores of the rod lens 24 and the optical fibers 22 and 23 are aligned (three-axis alignment) with respect to the three dimensional space (X, Y, Z). That is, the optical adhesive 33 is used to temporarily secure the lens holder 30 to the capillary 21 by holding the rod lens 24 and the optical fibers 22 and 23 in a three-axis aligned state. The optical adhesive 33 is cured normally within 10 to 15 minutes at a temperature of 120 to 150° C.

The structural adhesive 34 is used to improve the rigidity and durability of the filter module 20. Available as the structural adhesive 34 is a thermosetting epoxy adhesive which has a high viscosity (40000 cps or higher) and a glass transition temperature of 100° C. or higher and contains a filler of $SiO_2$ or the like.

Figure 6:
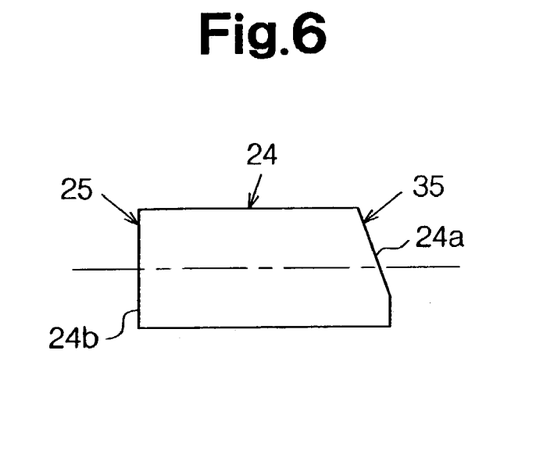
FIG. 6 is a side view of a gradient index rod lens of the filter module of FIG. 4.

As shown in FIG. 6, the end face 24a of the rod lens 24, which faces the optical fibers 22 and 23, is inclined by a predetermined angle (e.g., 8 degrees) with respect to the optical axis of the rod lens 24. An antireflection film 35 is formed on the end face 24a. The antireflection film 35 is used to reduce the reflection of light having a center wavelength of, for example, 1.48 $\mu$m or 1.55 $\mu$m. That is, the antireflection film 35 is used to suppress the reflectance of light with a wavelength of 1.48 $\mu$m or 1.55 $\mu$m to 0.2% or lower. The end face 24b of the rod lens 24, which is opposite to the optical fibers 22 and 23, is a flat face perpendicular to the optical axis. The wavelength selectivity reflection film 25 (a dielectric thin film having a wavelength selectivity) is formed on the end face 24b. The wavelength selectivity reflection film 25 is an edge filter or a band pass filter which, for example, reflects light with a wavelength of 1.48 $\mu$m (full reflection) and passes light with a wavelength of 1.55 $\mu$m (full transmission).

Figure 7:
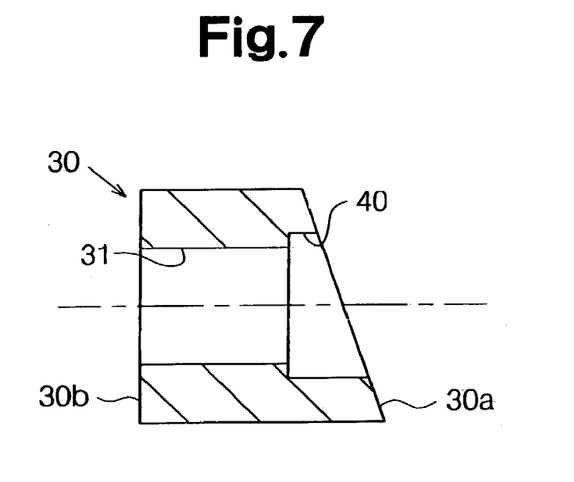
FIG. 7 is a cross-sectional view of a lens holder of the filter module of FIG. 4.

As shown in FIG. 7, the lens holder 30 is a cylinder having a lens holding hole 31. The annular end face 30a of the lens holder 30 is inclined by a predetermined angle (e.g., 8 degrees) with respect to the center axis of the lens holder 30. A resin dam 40, which is formed by a spot facing hole having an opening larger than the inside diameter of the lens holding hole 31 (the outside diameter of the rod lens 24), is adjacent to the inner end of the annular end face 30a. The end face 30b of the lens holder 30, which is opposite to the annular end face 30a, is a flat face perpendicular to the center axis of the lens holder 30.

The inside diameter of the lens holding hole 31 is set in accordance with the outside diameter of the rod lens 24 in consideration of the workability at the time of connecting the rod lens 24 to the lens holder 30. The outside diameter of the lens holder 30 is set slightly smaller than the outside diameter of the capillary 21.

Figure 8:
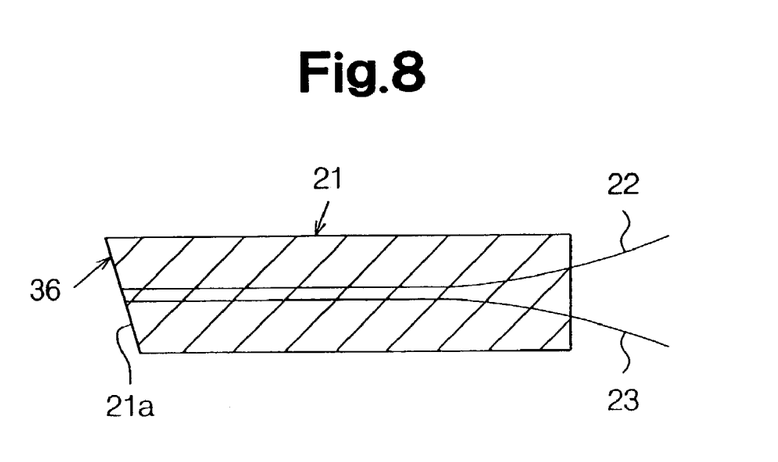
FIG. 8 is a cross-sectional view of a capillary of the filter module of FIG. 4.

As shown in FIG. 8, the capillary 21 is made of glass, such as Pyrex™. The capillary 21 has two optical fiber insertion holes (not shown) in which the optical fibers 22 and 23 are respectively inserted and fixed by an adhesive. The end face 21a of the capillary 21, which faces the rod lens 24, is inclined by a predetermined angle (e.g., 8 degrees) with respect to the center axis of the capillary 21. An antireflection film 36, which is identical to the antireflection film 35 formed on the end face 24a of the rod lens 24, is formed on the end face 21a.

A manufacturing method for the filter module 20 will be discussed below referring to FIGS. 9A through 9G.

(Step 1)

Figure 9A:
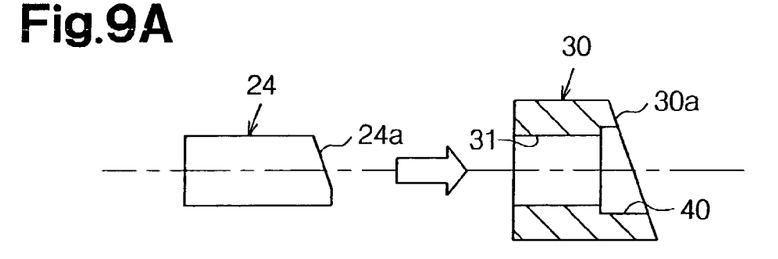
FIGS. 9A to 9E are cross-sectional views illustrating manufacturing steps for the filter module of FIG. 4 and FIGS. 9F and 9G are plan views illustrating the manufacturing steps for the filter module of FIG. 4.
Figure 9B:
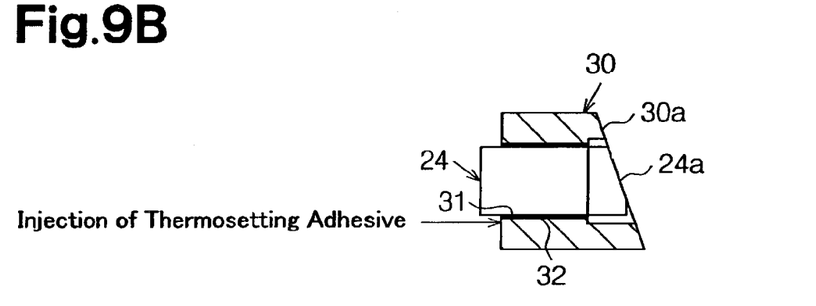

First, as shown in FIGS. 9A and 9B, the rod lens 24 is inserted into the lens holding hole 31 of the lens holder 30 and the rod lens 24 is positioned in the optimal position. In the optimal position, the angle and phase of the inclined end face 24a of the rod lens 24 substantially coincide with the angle and phase of the inclined annular end face 30a of the lens holder 30 and the end face 24a of the rod lens 24 does not protrude from the annular end face 30a of the lens holder 30.

(Step 2)

As shown in FIG. 9B, with the rod lens 24 and the lens holder 30 held in the optimal position, the thermosetting adhesive 32 is injected into the gap between the lens holding hole 31 and the rod lens 24 from the opposite side to the resin dam 40 of the lens holder 30. Then, the rod lens 24 and the lens holder 30 are heated at a temperature of 100° C. or higher to heat up and cure the thermosetting adhesive 32. In this way, the rod lens 24 is fixed to the lens holder 30. The use of the thermosetting adhesive 32, which is a thermosetting epoxy adhesive having a viscosity of 2000 cps or lower, can allow the adhesive 32 to sufficiently enter the gap between the inside diameter of the lens holder 30 and the rod lens 24, even if the gap is several tens of micrometers or narrower, and is cured.

(Step 3)

Figure 9C:
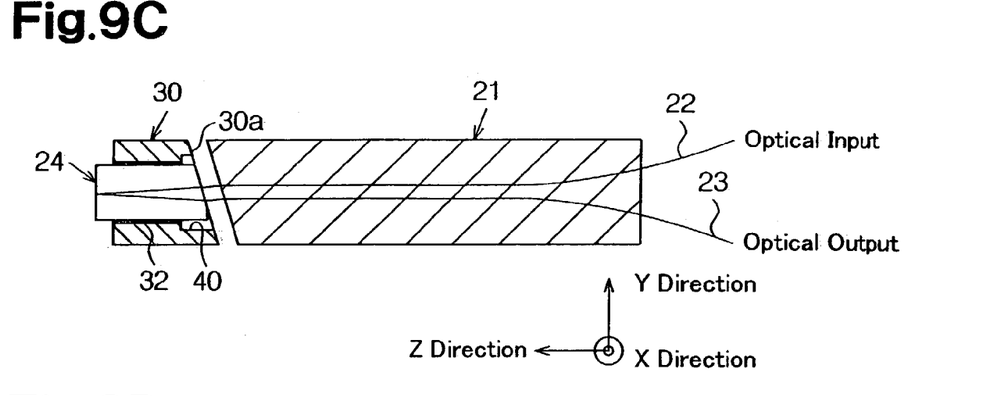

As shown in FIG. 9C, three-axis alignment for the rod lens 24 fixed to the lens holder 30 and the optical fibers 22 and 23 held on the capillary 21 is executed. In the three-axis alignment, the relative positions of the rod lens 24 and the capillary 21 are adjusted in the X, Y and Z axial directions such that light which has entered the rod lens 24 after traveling through one of the optical fibers 22 and 23 and has been reflected at the wavelength selectivity reflection film 25 is coupled to the other optical fiber. In the three-axis alignment, light with a wavelength of 1.48 μm is input to one optical fiber 22 and an optical output from the other optical fiber 23 is monitored. Then, the relative positions of the rod lens 24 and the capillary 21 are adjusted to maximize the optical output. In the three-axis alignment, the tolerances in the X and Y directions is ±0.3 μm or smaller. The tolerance of the gap between the rod lens 24 and the capillary 21 in the Z direction is set to several tens of micrometers (about 10 to 25 μm).

(Step 4)

Figure 9D:
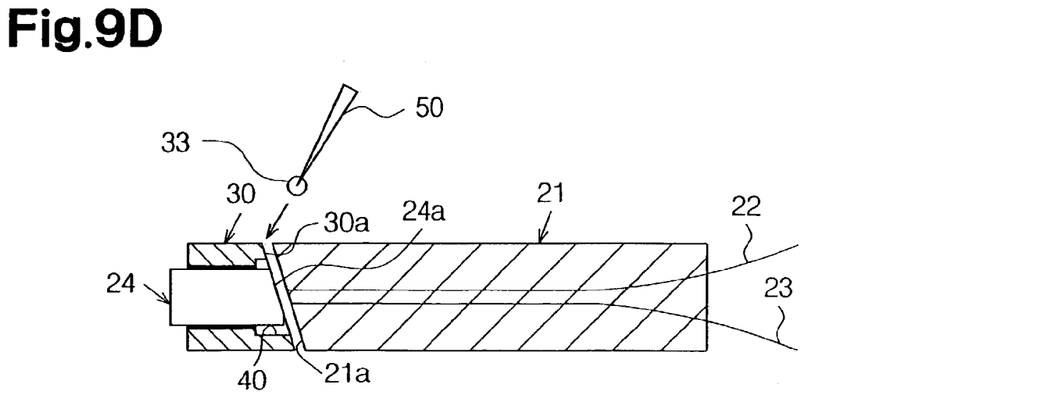

As shown in FIG. 9D, with the rod lens 24 and the capillary 21 held in the optical relative positions by the three-axis alignment, the optical adhesive (thermosetting epoxy adhesive) 33 is applied to the gap between the rod lens 24 and the capillary 21. A worker takes a slight amount of the optical adhesive 33 with a micro spatula 50 and applies the optical adhesive 33 to the gap. As the gap between the rod lens 24 and the capillary 21 is several tens of micrometers, the optical adhesive 33, when dropped into the gap, penetrates toward the inner peripheral end of the annular end face 30a by the capillary phenomenon. The optical adhesive 33 that has reached the inner peripheral end of the annular end face 30a enters the resin dam 40. Therefore, the resin dam 40 reliably prevents the optical adhesive 33 from entering the end face 24a of the rod lens 24. That is, the optical adhesive 33 does not penetrate the end face 24a of the rod lens 24.

Figure 9E:
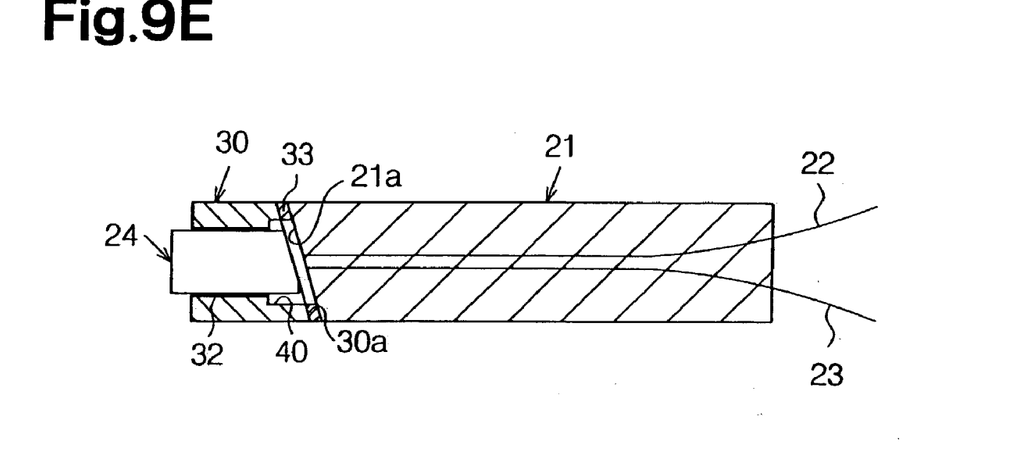
Figure 9F:
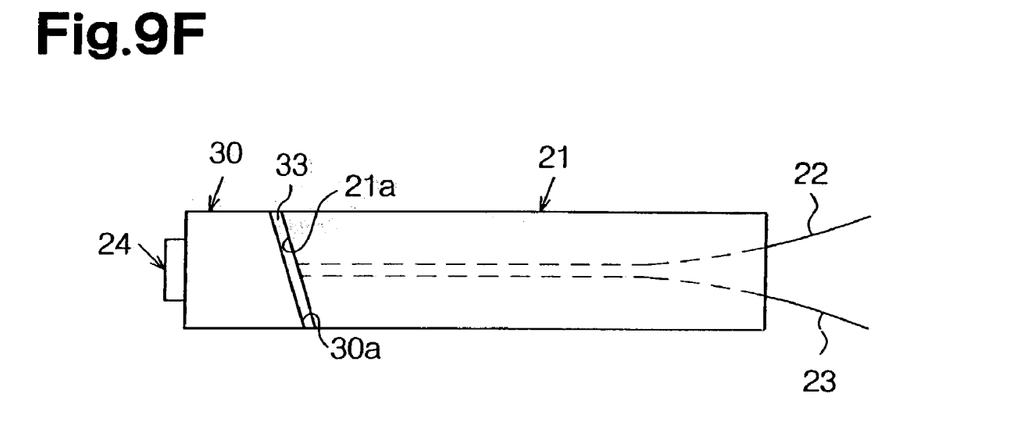

FIGS. 9E and 9F show a state where the optical adhesive 33 has penetrated the entire gap between the annular end face 30a of the lens holder 30 and the end face 21a of the capillary 21 by such application of the optical adhesive 33.

(Step 5)

After the application of the optical adhesive 33, the lens holder 30 and the capillary 21 are heated for as long as 15 minutes at a temperature of 120 to 150° C. For example, the lens holder 30 and the capillary 21 are heated for about 15 minutes at a temperature of 120° C. or are heated for about 10 minutes at a temperature of 150° C. In this case, a holding tool, which has a thermocouple and a heater, is used and the lens holder 30 and the capillary 21 are entirely held and heated by the holding tool.

During heating, the optical output may be reduced due to some factors, such as the contraction of the optical adhesive 33 and shifting of an alignment stage (not shown) which performs three-axis alignment. It is therefore preferable that the optical output should be monitored during heating and three-axis alignment should be repeated until the optical adhesive 33 would be cured in case where the optical output would have been reduced. As the optical adhesive 33 is cured, the color of its surface changes to lustrous reddish brown. It is therefore preferable to determine if the optical adhesive 33 has been cured by using a color sample of that reddish brown. The heating cures the optical adhesive 33 which connects the lens holder 30 to the capillary 21.

(Step 6)

Figure 9G:
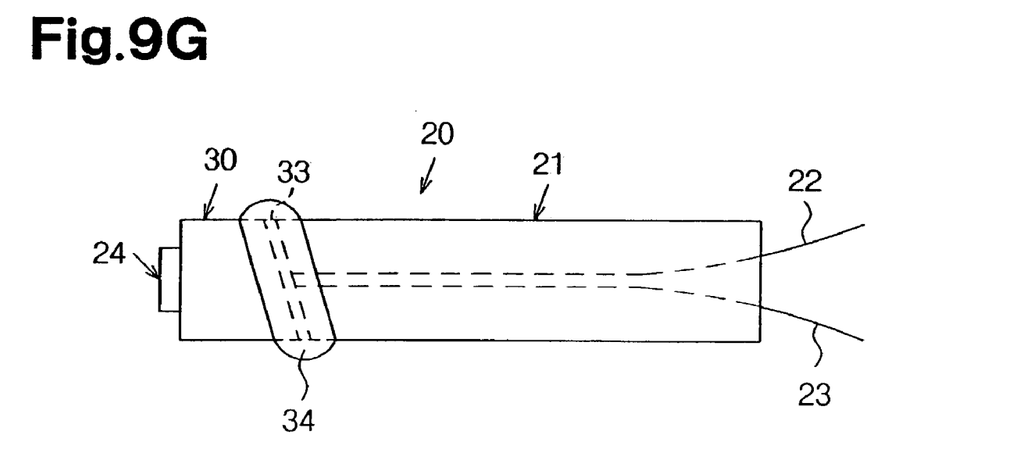

As shown in FIG. 9G, the structural adhesive 34 is potted (applied) to the portion between the lens holder 30 and the capillary 21, which is connected by the optical adhesive 33 and the entire connected portion, is covered with the adhesive 34. That is, the optical adhesive 33, the end portion of the outer surface of the lens holder 30 and the end portion of the outer surface of the capillary 21 are covered with the structural adhesive 34. At this time, the structural adhesive 34 is potted to completely cover the entire optical adhesive 33. Such potting is carried out by using an air type auto dispenser with a stereomicroscope of about ×10 magnification.

(Step 7)

After the potting of the structural adhesive 34, the adhesive 34 is heated for a predetermined time at a temperature of 100° C. or higher to be cured. When the structural adhesive 34 is cured, the lens holder 30 and the capillary 21 are integrated by the adhesive 34, thereby completing the filter module 20.

The filter module 20 according to the first embodiment has the following advantages.

(a) The annular end face 30a of the lens holder 30, which holds the rod lens 24, and the end face 21a of the capillary 21 are connected together by the optical adhesive 33. This prevents the adhesive from entering the end face 24a of the rod lens 24. Therefore, no treatment is applied to the end face 24a of the rod lens 24, so that the end face 24a will not be damaged. Since the optical adhesive 33 is not intervened in the optical path of the rod lens 24, reduction in light intensity is inhibited, thus resulting an improved light-resistant power. Because it is unnecessary to use an adhesive whose refractive index is matched with the refractive indexes of the rod lens 24 and the optical fibers 22 and 23, the degree of freedom of selection of the adhesive is increased.

(b) The resin dam 40 is formed by the spot facing hole, which is larger than the outside diameter of the rod lens 24, is provided at the inner end of the annular end face 30a of the lens holder 30. When the optical adhesive 33, which is applied in the gap between the annular end face 30a of the lens holder 30 and the end face 21a of the capillary 21, reaches the inner end of the annular end face 30a, therefore, the adhesive 33 enters the resin dam 40. Therefore, the resin dam 40 reliably inhibits the adhesive 33 from entering the end face 24a of the rod lens 24.

(c) Since the lens holder 30 and the capillary 21 are integrated by the structural adhesive 34, an optical component having rigidity and durability is obtained.

(d) The provision of the resin dam 40 makes the amount of allowance of the optical adhesive 33 relatively larger, thus facilitating the application of the optical adhesive 33.

(e) The inclined end face 21a of the capillary 21, the inclined end faces of the optical fibers 22 and 23, the inclined end face 24a of the rod lens 24 and the inclined annular end face 30a of the lens holder 30 reduce reflected and returning light. The antireflection film 36 formed on the end face 21a of the capillary 21 and the end faces of the optical fibers 22 and 23 and the antireflection film 35 formed on the end face 24a of the rod lens 24 reduce reflection of lights with specific center wavelengths of 1.48 $\mu$m and 1.55 $\mu$m.

(f) Since the antireflection film is coated on both end faces 24a and 24b of the rod lens 24, the weather resistance is improved.

(g) Since the wavelength selectivity reflection film 25, which is a dielectric thin film having a wavelength selectivity, is formed on the end face 24b of the rod lens 24, it is unnecessary to prepare a separate filter. This reduces the number of fabrication steps and thus reduces the manufacturing cost.

At the time three-axis alignment is performed, light reflected at the wavelength selectivity reflection film 25 is monitored. This makes it unnecessary to monitor the output light by using an optical element, such as a filter or a mirror, for three-axis alignment.

(h) As a thermosetting epoxy adhesive with a viscosity of 2000 cps or lower is used as the thermosetting adhesive 32, the adhesive 32 sufficiently enters the gap between the lens holder 30 and the rod lens 24 which is several tens of micrometers or narrower.

(i) In case where the optical output, which is monitored during heating of the optical adhesive 33, drops, three-axis alignment is repeated until the optical adhesive 33 is cured. Therefore, the rod lens 24 and the capillary 21 are connected together by the optical adhesive 33 while the rod lens 24 and the capillary 21 are held in the optimal relative positions.

(j) At the time three-axis alignment is repeated until the optical adhesive 33 is cured, a work of determining if the optical adhesive 33 has been cured is carried out by using a color sample of the cured state of the optical adhesive. This facilitates the decision work.

Figure 10:
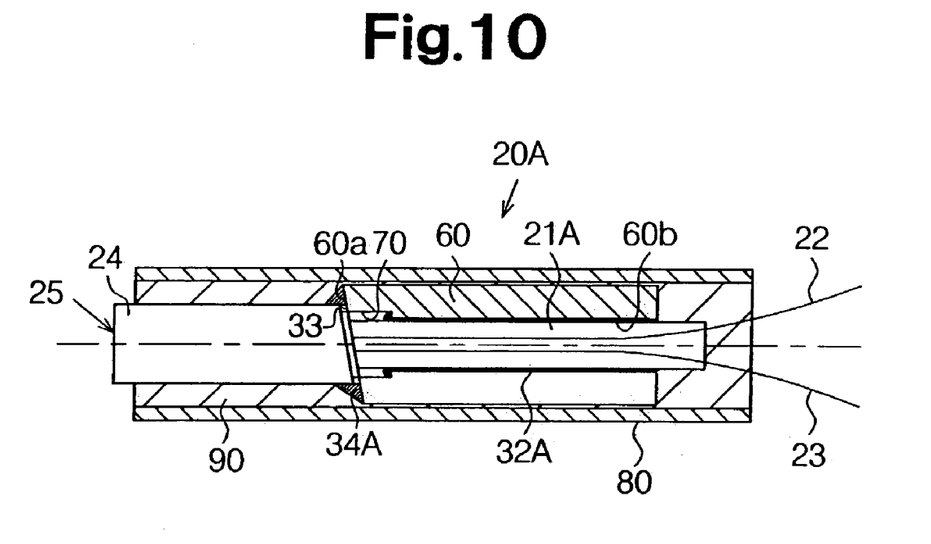
FIG. 10 is a cross-sectional view of a filter module according to a second embodiment of the present invention.
Figure 11:
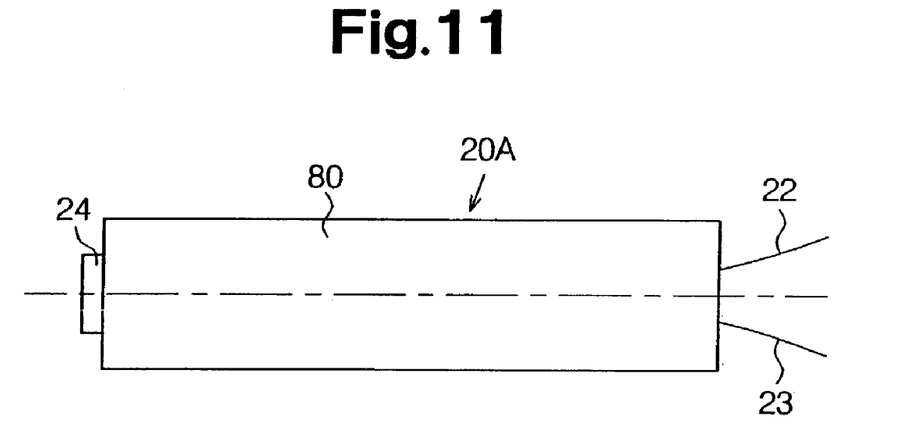
FIG. 11 is a plan view of the filter module of FIG. 10.

FIGS. 10 and 11 show a filter module 20A according to a second embodiment of the present invention. In the second embodiment, a resin dam 70 (see FIG. 12) is provided on an annular end face 60a of a cylindrical capillary holder 60 which holds a capillary 21A. The filter module 20A is a collimator type filter which uses an optical fiber collimator (dual fiber collimator) in which the two optical fibers 22 and 23 are optically connected to the gradient index rod lens 24.

A part of the annular end face 60a of the cylindrical capillary holder 60, which holds the capillary 21A, and a part (peripheral portion) of the end face 24a of the rod lens 24 are connected together by the optical adhesive 33. The resin dam 70, which is formed by a spot facing hole whose opening is larger than the outside diameter of the capillary 21A (the inside diameter of a capillary holding hole 60b of the capillary holder 60) and smaller than the outside diameter of the rod lens 24, is adjacent to the inner end of the annular end face 60a of the capillary holder 60.

The entire portion where the annular end face 60a of the capillary holder 60 is connected to the end face 24a of the rod lens 24 by the optical adhesive 33 is covered with a structural adhesive 34A, thereby integrating the capillary holder 60 and the rod lens 24. Further, the capillary holder 60 and the rod lens 24 integrated by the structural adhesive 34A is covered with a tube 80 which holds the capillary holder 60 and the rod lens 24 in an integrated fashion.

A manufacturing method for the filter module 20A will be discussed below referring to FIGS. 13A through 13I.

(Step 1)

Figure 13A:
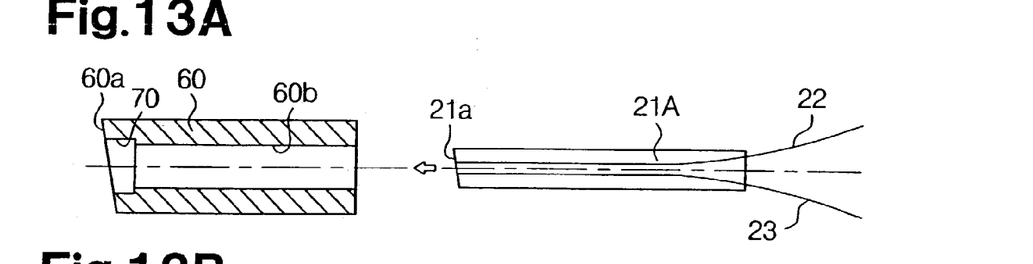
FIGS. 13A to 13I are cross-sectional views illustrating manufacturing steps for the filter module of FIG. 10.
Figure 13B:
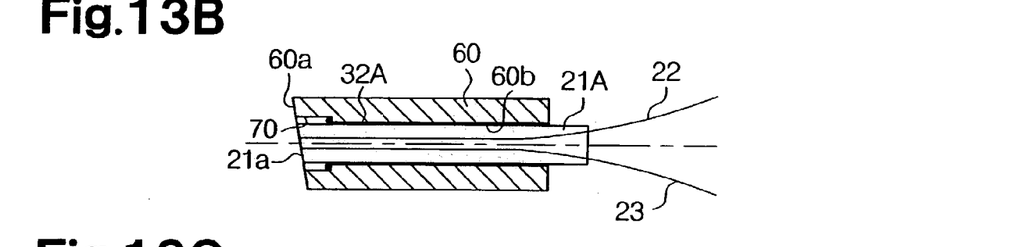

First, as shown in FIGS. 13A and 13B, the capillary 21A is inserted into the capillary holding hole 60b of the capillary holder 60 and the capillary 21A and the capillary holder 60 are positioned in the optimal position. In the optimal position, the angle and phase of the inclined end face 21a of the capillary 21A substantially coincide with the angle and phase of the inclined annular end face 60a of the capillary holder 60 and the end face 21a and the annular end face 60a are placed at the same level. It is preferable that the work of placing the end face 21a and the annular end face 60a should be carried out while observing the work with a stereomicroscope.

(Step 2)

As shown in FIG. 13B, with the capillary 21A and the capillary holder 60 held in the optimal position, the thermosetting adhesive 32A is injected into the gap between the capillary holding hole 60b and the capillary 21A from the opposite side to the resin dam 70, and the adhesive 32A is heated up to be cured. This causes the capillary 21A and the capillary holder 60 to be connected securely.

(Step 3)

Figure 13C:
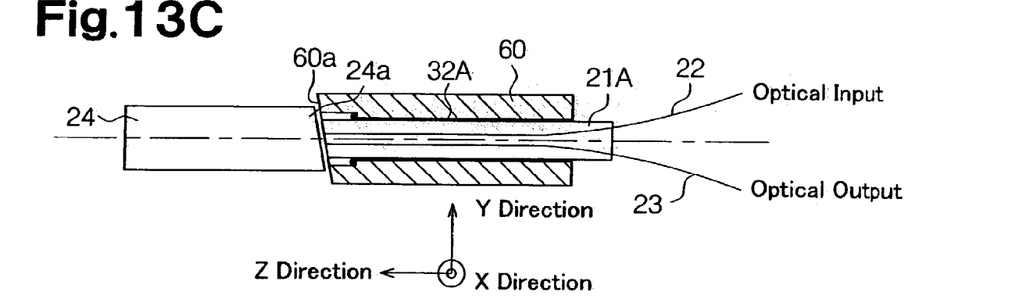

As shown in FIG. 13C, three-axis alignment for the rod lens 24 and the optical fibers 22 and 23 is executed to place the rod lens 24 and the optical fibers 22 and 23 in the optimal relative positions, as per the first embodiment.

(Step 4)

Figure 13D:
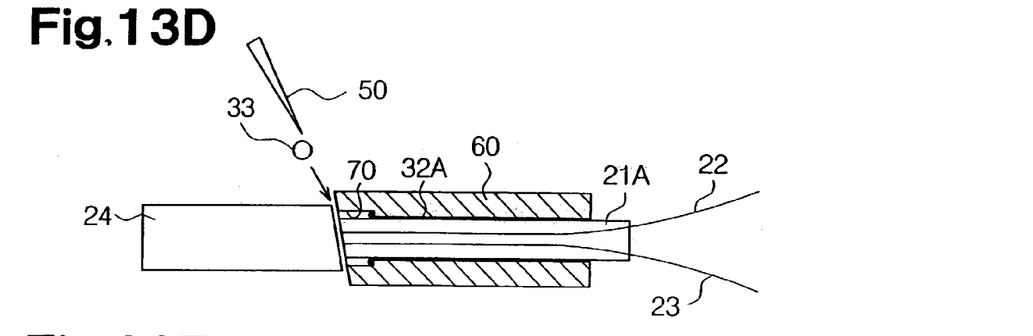

As shown in FIG. 13D, with the rod lens 24 and the optical fibers 22 and 23 held in the optimal relative positions through the three-axis alignment, the optical adhesive 33 is applied to the gap between the end face 24a and the annular end face 60a. At this time, a worker takes a slight amount of the optical adhesive 33 with a micro spatula 50 and applies the optical adhesive 33 to the gap. As the gap between the rod lens 24 and the capillary holder 60 is several tens of micrometers, the optical adhesive 33, dropped into the gap, penetrates toward the inner peripheral end of the annular end face 60a of the capillary holder 60 by the capillary phenomenon.

When the optical adhesive 33 reaches the inner peripheral end of the annular end face 60a, the optical adhesive 33 enters the resin dam 70. Therefore, the resin dam 70 reliably prevents the optical adhesive 33 from entering the end face 24a of the rod lens 24. That is, the optical adhesive 33 does not penetrate the end face 24a of the rod lens 24.

Figure 13E:
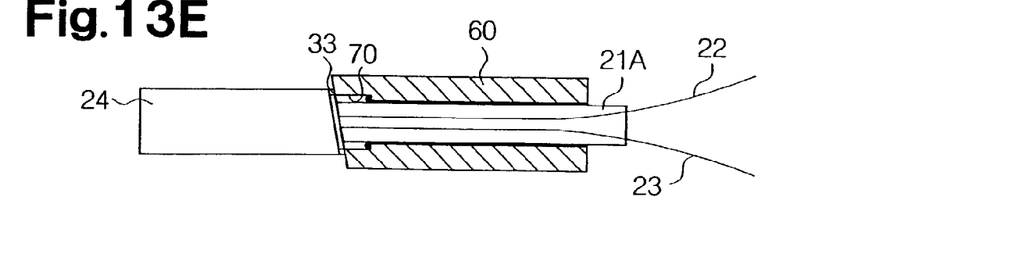

FIG. 13E shows a state where the optical adhesive 33 has penetrated the entire gap between the end face 24a and the annular end face 60a.

(Step 5)

After the application of the optical adhesive 33, the rod lens 24 and the capillary holder 60 are entirely heated for as long as 15 minutes at a temperature of 120 to 150° C. For example, the rod lens 24 and the capillary holder 60 are entirely heated for as long as about 15 minutes at a temperature of 120° C. or are heated for about 10 minutes at a temperature of 150° C. This heating cures the optical adhesive 33, thereby connecting the rod lens 24 to the capillary holder 60.

(Step 6)

Figure 13F:
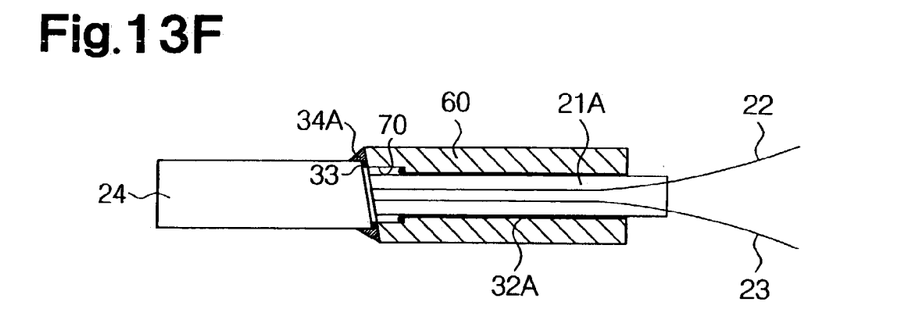

As shown in FIG. 13F, the structural adhesive 34A is potted to the entire connected portion of the rod lens 24 and the capillary holder 60. The potting allows the structural adhesive 34A to cover the optical adhesive 33, the end portion of the outer surface of the rod lens 24 and the end portion of the outer surface of the capillary holder 60.

(Step 7)

After the potting, the structural adhesive 34A is heated for a predetermined time at a temperature of 100° C. or higher to be cured. When the structural adhesive 34A is cured, the rod lens 24 and the capillary holder 60 are integrated by the adhesive 34A.

(Step 8)

Figure 13G:
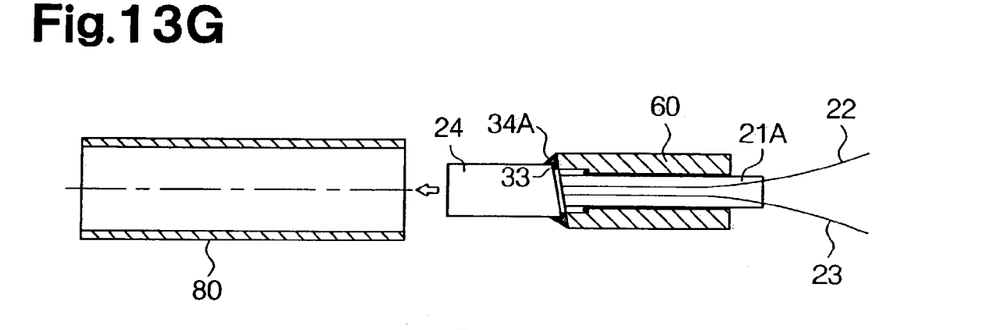
Figure 13H:
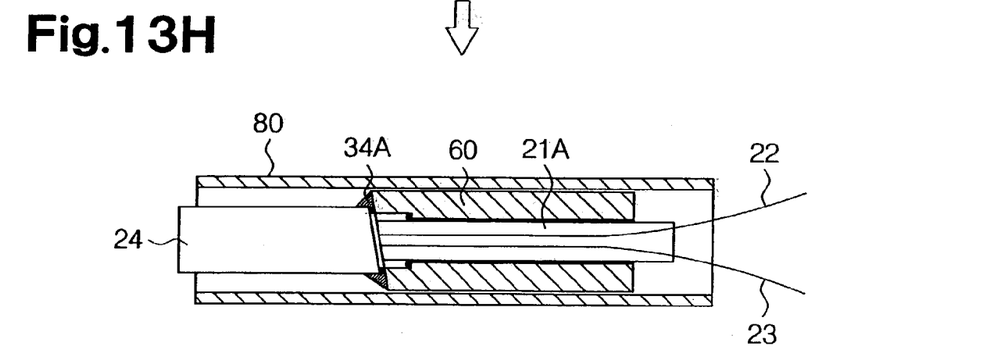

Thereafter, as shown in FIGS. 13G and 13H, the integrated rod lens 24 and capillary holder 60 are inserted into the tube 80.

(Step 9)

Figure 13I:
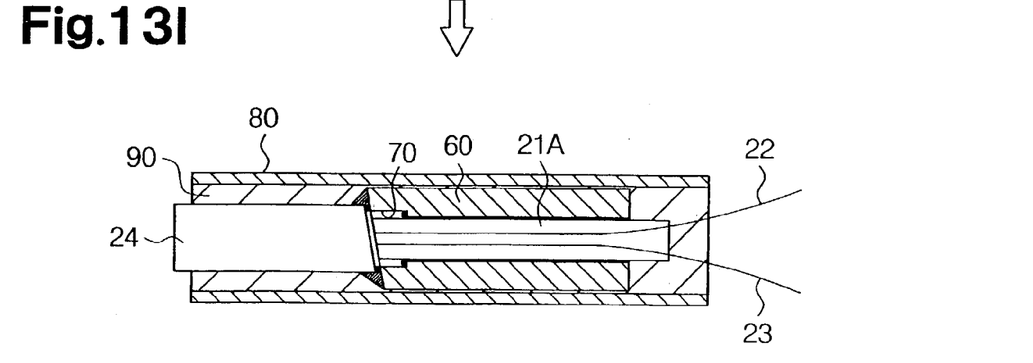

Thereafter, as shown in FIG. 13I, a structural adhesive 90 is potted in the space between the outer surfaces of the rod lens 24 and the capillary holder 60 and the inner surface of the tube 80, and the adhesive 90 is cured to integrate the rod lens 24, the tube 80 and the capillary holder 60. This completes the filter module 20A.

The filter module 20A according to the second embodiment has the following advantages.

(a) A part of the annular end face 60a of the capillary holder 60 and the peripheral portion of the end face 24a of the rod lens 24 are connected together by the optical adhesive 33. This prevents the adhesive from entering at least that portion of the end face 24a of the rod lens 24 which corresponds to the optical path. Therefore, no treatment is applied to that area of the end face 24a of the rod lens 24 which excludes the peripheral portion of the end face 24a, so that the end face 24a will not be damaged. Since the optical adhesive 33 is not intervened in the optical path of the rod lens 24, reduction in light intensity is inhibited, thus resulting an improved light-resistant power. Because it is unnecessary to an adhesive whose refractive index is matched with the refractive indexes of the rod lens 24 and the optical fibers 22 and 23, the degree of freedom of selection of the adhesive is increased.

Figure 12:
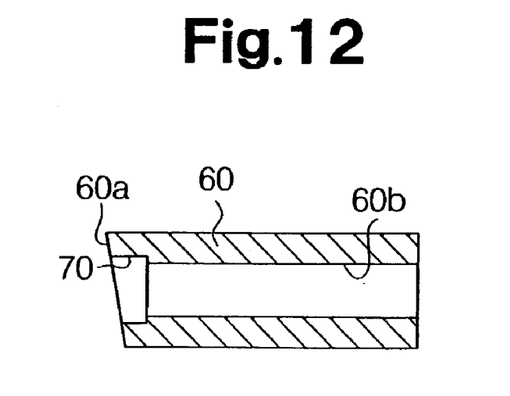
FIG. 12 is a cross-sectional view of a capillary holder of the filter module of FIG. 10.

(b) Since the resin dam 70 is provided at the inner end of the annular end face 60a, the resin dam 70 reliably inhibits the optical adhesive 33 from entering at least that portion of the end face 24a of the rod lens 24 which corresponds to the optical path.

(c) The entire connected portion of the rod lens 24 and the capillary holder 60 is covered with the structural adhesive 34A, thereby integrating the rod lens 24 and the capillary holder 60. This provides the filter module 20A which has rigidity and durability.

(d) The provision of the resin dam 70 makes the amount of allowance of the optical adhesive 33 relatively larger, thus facilitating the application of the optical adhesive 33.

(e) The integrated rod lens 24 and capillary holder 60 are inserted into the tube 80 and the structural adhesive 90 is potted in the tube 80. This integrates the rod lens 24, the tube 80 and the capillary holder 60. This further improves the rigidity and durability of the filter module 20A.

It should be apparent to those skilled in the art that the present invention may be embodied in many other specific forms without departing from the spirit or scope of the invention. Particularly, it should be understood that the invention may be embodied in the following forms.

The present invention may be adapted to a filter module of a single fiber collimator type which uses a single optical fiber, as well as a filter module of a dual fiber collimator which uses two optical fibers.

The present invention may be adapted to a single fiber or dual fiber collimator which does not have the wavelength selectivity reflection film 25. The present invention may be adapted to a collimator in which the rod lens and the capillary that holds an optical fiber are separated from each other by a predetermined distance.

The resin dam 40 may be omitted.

The resin dam 40 may be formed in a midway of the annular end face 30a.

The resin dam 40 may be formed at the end face 21a of the capillary 21 by a spot facing hole which is larger than the outside diameter of the rod lens 24. Further, the resin dam 40 may be formed at both the lens holder 30 and the capillary 21.

In the first embodiment, the lens holder 30 and the capillary 21 integrated by the structural adhesive 34 may be retained in the tube 80 as indicated by two-dot chain lines in FIG. 5.

Ultraviolet curing adhesives may be used in place of the thermosetting adhesives that are used as the optical adhesive 33 and the structural adhesive 34 or 34A and the thermosetting adhesive 32 or 32A.

Therefore, the present examples and embodiments are to be considered as illustrative and not restrictive and the invention is not to be limited to the details given herein, but may be modified within the scope and equivalence of the appended claims.

What is claimed is:

1. A collimator comprising:
    an optical fiber;
    a capillary for holding the optical fiber;
    a gradient index rod lens; and
    a cylindrical holder which holds one of the capillary and the gradient index rod lens and has an annular end face connected to an end face of one of the capillary and the gradient index rod lens by an adhesive, and the holder has a dam which is adjacent to the annular end face and prevents the adhesive from entering the end face of the one of the capillary and the gradient index rod lens.

2. The collimator according to claim 1, further having a structural adhesive which entirely covers a portion where the annular end face of the holder is connected to the end face of the one of the capillary and the gradient index rod lens.

3. The collimator according to claim 1, further having a tube for retaining the capillary, the gradient index rod lens and the holder.

4. A collimator comprising:
    an optical fiber;
    a capillary for holding the optical fiber;
    a gradient index rod lens; and
    a cylindrical lens holder which holds the gradient index rod lens and has an annular end face connected to an end face of the capillary by an adhesive, and the lens holder has a dam which is adjacent to the annular end face and prevents the adhesive from entering the end face of the gradient index rod lens.

5. The collimator according to claim 4, wherein the lens holder has an opening larger than an outside diameter of the gradient index rod lens and a spot facing hole for formation of the dam.

6. The collimator according to claim 4, further having a structural adhesive which entirely covers a portion where the annular end face of the lens holder is connected to the end face of the capillary.

7. The collimator according to claim 4, further having a tube for retaining the capillary, the gradient index rod lens and the lens holder.

8. The collimator according to claim 4, wherein the optical fiber is one of first and second optical fibers, light output from the first optical fiber is collimated by the gradient index rod lens, reflected light of the collimated light is condensed by the gradient index rod lens, and the condensed light is coupled to the second optical fiber.

9. The collimator according to claim 4, wherein the end face of the capillary, an end face of the optical fiber, the annular end face of the lens holder and the end face of the gradient index rod lens are inclined.

10. The collimator according to claim 9, further having a plurality of antireflection films respectively formed on the end face of the capillary, the end face of the optical fiber, the annular end face of the lens holder and the end face of the gradient index rod lens.

11. The collimator according to claim 4, further having a dielectric thin film having a wavelength selectivity formed on a second end face of the gradient index rod lens on an opposite side to a first end face of the gradient index rod lens which faces the end face of the capillary.

12. A collimator comprising:
an optical fiber;
a capillary for holding the optical fiber;
a gradient index rod lens; and
a capillary lens holder which holds the capillary and has an annular end face connected to an end face of the gradient index rod lens by an adhesive, and the capillary holder has a dam which is adjacent to the annular end face and prevents the adhesive from entering the end face of the capillary.

13. The collimator according to claim 12, wherein the capillary holder has an opening larger than an outside diameter of the capillary and smaller than an outside diameter of the gradient index rod lens, and a spot facing hole for formation of the dam.

14. The collimator according to claim 12, further having a structural adhesive which entirely covers a portion where the annular end face of the capillary holder is connected to the end face of the gradient index rod lens.

15. The collimator according to claim 12, further having a tube for retaining the capillary, the gradient index rod lens and the capillary holder.

16. A method of manufacturing a collimator, comprising the steps of:
preparing a capillary holding an optical fiber, a gradient index rod lens and a cylindrical lens holder for holding the gradient index rod lens, the lens holder having an annular end face;
causing the lens holder to hold the gradient index rod lens by inserting the gradient index rod lens into the lens holder; and
connecting the annular end face of the lens holder to an end face of the capillary by an adhesive, and the lens holder has a dam which is adjacent to the annular end face and prevents the adhesive from entering the end face of the gradient index rod lens.

17. The method according to claim 16, further comprising the step of entirely covering a portion where the annular end face of the lens holder is connected to the end face of the capillary with a structural adhesive.

18. A method of manufacturing a collimator, comprising the steps of:
preparing a capillary holding an optical fiber, a gradient index rod lens and a cylindrical capillary holder for holding the capillary, the capillary having an annular end face;
causing the capillary holder to hold the capillary by inserting the capillary into the capillary holder; and
connecting the annular end face of the capillary holder to an end face of the gradient index rod lens by an adhesive, and the capillary holder has a dam which is adjacent to the annular end face and prevents the adhesive from entering the end face of the capillary.

19. The method according to claim 18, further comprising the step of entirely covering a portion where the annular end face of the capillary holder is connected to the end face of the gradient index rod lens with a structural adhesive.

* * * * *